United States Patent
Fan et al.

(10) Patent No.: US 10,093,353 B2
(45) Date of Patent: Oct. 9, 2018

(54) POWER-ASSISTED STEERING SYSTEM AND MOBILE INSPECTION DEVICE

(71) Applicants: Nuctech Company Limited, Beijing (CN); Nuctech Jiangsu Company Limited, Jiangsu (CN)

(72) Inventors: Xuping Fan, Beijing (CN); Junping Shi, Beijing (CN); Ke Li, Beijing (CN); Dongyu Wang, Beijing (CN)

(73) Assignees: NUCTECH COMPANY LIMITED, Beijing (CN); NUCTECH JIANGSU COMPANY LIMITED, Jiangsu (CN)

( * ) Notice: Subject to any disclaimer, the term of this patent is extended or adjusted under 35 U.S.C. 154(b) by 104 days.

(21) Appl. No.: 15/280,980

(22) Filed: Sep. 29, 2016

(65) Prior Publication Data

US 2017/0183030 A1     Jun. 29, 2017

(30) Foreign Application Priority Data

Dec. 29, 2015   (CN) .......................... 2015 1 1016561

(51) Int. Cl.
*B62D 5/06*     (2006.01)
*B62D 5/07*     (2006.01)

(52) U.S. Cl.
CPC ............. *B62D 5/064* (2013.01); *B62D 5/063* (2013.01); *B62D 5/07* (2013.01)

(58) Field of Classification Search
CPC .......... B62D 5/07; B62D 5/063; B62D 5/064; G01V 5/0008; G01V 5/0016

(Continued)

(56) References Cited

U.S. PATENT DOCUMENTS

| 5,279,380 | A | 1/1994 | Frank et al. |
| 6,283,243 | B1 | 9/2001 | Bohner et al. |

(Continued)

FOREIGN PATENT DOCUMENTS

| CN | 101439663 | 5/2009 |
| CN | 102501917 A | 6/2012 |

(Continued)

OTHER PUBLICATIONS

Extended European Search Report dated Nov. 17, 2017 in EP Application No. 16190478.4 in 11 pages.

(Continued)

*Primary Examiner* — Joseph M Rocca
*Assistant Examiner* — Felicia L. Brittman
(74) *Attorney, Agent, or Firm* — Knobbe Martens Olson and Bear LLP

(57) ABSTRACT

The present disclosure relates to power-assisted steering systems and mobile inspection devices. Implementations may include and/or involve a directional control valve, a second hydraulic pump and a first driving motor. When determining an engine on a chassis has not been started, a central control unit may control start of the first driving motor according to a received travelling instruction such that the first driving motor drives the second hydraulic pump and then the power-assisted steering motor can be driven through a second oil path of the second hydraulic pump. Accordingly, the power-assisted steering system can be driven to operate when the mobile inspection device is in operation and the engine on chassis is not started, thus it is possible to drive the power-assisted steering system without the chassis engine operating.

20 Claims, 2 Drawing Sheets

(58) Field of Classification Search
USPC .......................................................... 180/422
See application file for complete search history.

(56) References Cited

U.S. PATENT DOCUMENTS

| | | | |
|---|---|---|---|
| 6,285,936 B1 | 9/2001 | Bohner et al. | |
| 2015/0246622 A1 | 9/2015 | Ichikawa | |
| 2016/0061989 A1* | 3/2016 | Kang | G01V 5/0066 250/393 |
| 2016/0180186 A1* | 6/2016 | Sun | G06K 9/00201 382/104 |

FOREIGN PATENT DOCUMENTS

| | | | |
|---|---|---|---|
| CN | 102556185 A | | 7/2012 |
| CN | 203255243 U | | 10/2013 |
| CN | 102501917 B | | 11/2013 |
| CN | 203268119 U | * | 11/2013 |
| CN | 203268119 U | | 11/2013 |
| CN | 103895699 A | | 7/2014 |
| CN | 204726503 U | | 10/2015 |
| CN | 205440519 U | | 8/2016 |
| EP | 1582437 | | 5/2005 |
| JP | 2013/091378 | | 5/2013 |
| RU | 2248295 | | 3/2005 |
| RU | 48921 | | 11/2005 |

OTHER PUBLICATIONS

Notice of Allowance dated Sep. 28, 2017 in Russian Application No. 2016137681 in 8 pages, with English translation thereof in 6 pages.

First Office Action and Search Report dated Apr. 21, 2017, in related Chinese Application No. 201511016561.1 (7 pages), and concise English-language summary/translation thereof (1 page); 8 pages total.

Partial European Search Report dated May 23, 2017, in related EP Application No. 16190478.4, 12 pages.

* cited by examiner

POWER-ASSISTED STEERING SYSTEM AND MOBILE INSPECTION DEVICE

CROSS REFERENCE TO RELATED APPLICATION(S)

This application is based upon and claims benefit/priority of Chinese Patent Application No. 201511016561.1 filed on Dec. 29, 2015, published as CN105438255, which are incorporated herein by reference in entirety.

BACKGROUND

Field

The present disclosure relates to a field of container scanning, and more particularly to a mobile inspection device and a power-assisted steering system for a mobile inspection device.

Description of Related Information

A power-assisted steering system of vehicle can helps drivers to adjust vehicle's travelling direction such that the drivers can provide less effort to turn steering wheels. Normally, a vehicle is provided with a power-assisted steering system. An engine on chassis drives a hydraulic pump which then drives a power-assisted steering motor so as to provide power steering to a steering wheel. A mobile inspection device is disposed on a vehicle, and can scan a container(s) on a vehicle being detected while the vehicle is travelling.

During operation of the existing power-assisted steering system of the mobile inspection device, the engine on chassis usually is not started, and the vehicle is driven by a third-party power source to travel forward, travel backward and steer. However, if the engine on chassis is not started, the hydraulic pump cannot be powered and the power-assisted steering system of the vehicle fails to operate due to lack of power. In this case, a driver should provide more effort to turn the steering wheel, which causes inconvenience.

Therefore, there is needed a power-assisted steering solution applied in a mobile inspection device in order to solve the above technical problems.

OVERVIEW OF SOME ASPECTS

To overcome the above disadvantages in existing solutions, it is an advantage of the present disclosure to provide a power-assisted steering system and a mobile inspection device which can prevent the power-assisted steering system from failing to operate when the engine on chassis of the mobile inspection device is not started.

To achieve this and other advantage(s), according to an aspect of the disclosure, there is provided a power-assisted steering system, comprising: a central control unit, a power-assisted steering motor and a first hydraulic pump connected to an engine on chassis, wherein the power-assisted steering system further comprises a directional control valve, a second hydraulic pump and a first driving motor, wherein the first driving motor is connected to the second hydraulic pump; the directional control valve is connected to each of the first hydraulic pump, the second hydraulic pump and the power-assisted steering motor so as to switch between a first oil path of the first hydraulic pump and a second oil path of the second hydraulic pump for driving the power-assisted steering motor; the central control unit is configured to: when receiving a travelling instruction, determine whether the engine on chassis has been started; and if the engine on chassis has not been started, control to start the first driving motor such that the first driving motor drives the second hydraulic pump and thus the power-assisted steering motor can be driven through the second oil path of the second hydraulic pump.

Further, the power-assisted steering system further comprises a remote control device and a steering device connected to a steering wheel; the central control unit is further configured to: receive the travelling instruction transmitted from the remote control device; and when determining the engine on chassis has not been started, control steering of the steering device according to the travelling instruction.

According to implementations herein, the second hydraulic pump is a hydraulic duplex pump, wherein one hydraulic pump of the hydraulic duplex pump is connected to the directional control valve via the second oil path, and the other hydraulic pump of the hydraulic duplex pump is connected to the steering device via a third oil path; when the first driving motor is started, the hydraulic duplex pump can drive the power-assisted steering motor via the second oil path and supply oil to the steering device via the third oil path.

Further, the remote control device may comprise a remote controller and a remote receiver, wherein the remote receiver is adapted to receive the travelling instruction transmitted from the remote controller and transmit the travelling instruction to the central control unit.

In some embodiments, the steering device may comprise a hydraulic directional control valve and a hydraulic motor, wherein the hydraulic motor is connected to each of the hydraulic directional control valve and the steering wheel; the central control unit is further configured to: control the hydraulic directional control valve according to the travelling instruction so as to select an oil path through which oil will be supplied to the hydraulic motor, such that the hydraulic motor controls steering of the steering wheel according to the selected oil path.

Further, the power-assisted steering system further comprises a second driving motor; the central control unit is further configured to: after controlling to start the first driving motor, control to start the second driving motor so as to power the vehicle.

According to some aspects, the central control unit is configured to: after controlling to start the first driving motor for a predetermined period of time, control to start the second driving motor.

According to another aspect of the disclosure, there is provided a mobile inspection device, comprising: a vehicle, a radiation source and a detection device that are disposed on the vehicle, wherein the vehicle comprises the afore-mentioned power-assisted steering system.

The present disclosure provides the directional control valve, the second hydraulic pump and the first driving motor. When determining the engine on chassis has not been started, the central control unit controls to start the first driving motor according to the received travelling instruction such that the first driving motor drives the second hydraulic pump and then the power-assisted steering motor can be driven through the second oil path of the second hydraulic pump. Accordingly, the power-assisted steering system can be driven to operate when the mobile inspection device is in operation and the engine on chassis is not started, thus it is possible to drive the power-assisted steering system without the engine on chassis. Moreover, it is easy to manipulate a steering wheel to control a travelling direction, thus it is possible to improve operational flexibility and adaptability of the power-assisted steering system of the mobile inspection device.

Figure 1:
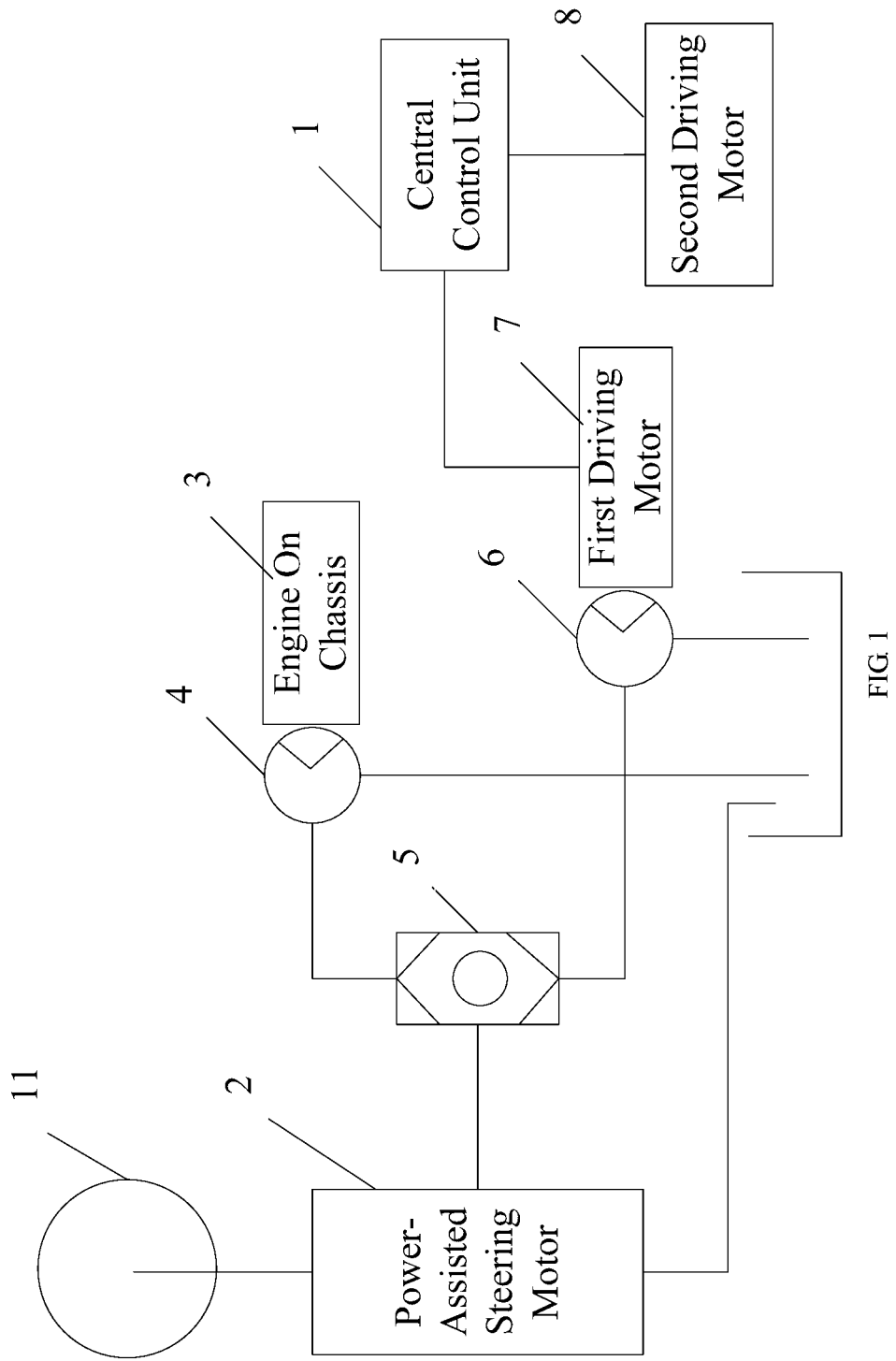
FIG. 1 is a structural diagram of a power-assisted steering system according to a first example of the present disclosure.

Reference Numerals: 1 Central Control Unit; 2 Power-assisted Steering Motor; 3 Engine on Chassis; 4 First Hydraulic Pump; 5 Directional Control Valve; 6 Second Hydraulic Pump; 7 First Driving Motor; 8 Second Driving Motor; 9 Remote Control Device; 10 Steering Device; 11 Steering Wheel; 91 Remote Controller; 92 Remote Receiver; 101 Hydraulic Directional Control Valve; 102 Hydraulic Motor.

DETAILED DESCRIPTION OF ILLUSTRATIVE IMPLEMENTATIONS

In order to make features, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

The present disclosure provides a directional control valve, a second hydraulic pump and a first driving motor to switch modes of driving a power-assisted steering system, such that the power-assisted steering system can be driven when a mobile inspection device is in operation and an engine on chassis is not started and thereby it is easy to manipulate a steering wheel.

In order to clearly explain technical solutions of the present disclosure, a power-assisted steering system of the present disclosure will be described in detail with reference to the following examples in connection with FIGS. 1 and 2.

First Example

FIG. 1 is a structural diagram of a power-assisted steering system according to a first example of the present disclosure. As shown in FIG. 1, the power-assisted steering system comprises a central control unit 1, a power-assisted steering motor 2 and a first hydraulic pump 4, wherein the first hydraulic pump 4 is connected to an engine on chassis 3. The power-assisted steering system further comprises a directional control valve 5, a second hydraulic pump 6 and a first driving motor 7, wherein the first driving motor 7 is connected to the second hydraulic pump 6. The directional control valve 5 is connected to each of the first hydraulic pump 4, the second hydraulic pump 6 and the power-assisted steering motor 2 so as to switch between a first oil path of the first hydraulic pump and a second oil path of the second hydraulic pump and thereby switch between respective hydraulic sources for the power-assisted steering motor 2. The power-assisted steering motor 2 is powered through the oil paths of the hydraulic pumps. That is to say, the power-assisted steering motor 2 can be powered by the first hydraulic pump 4 that is driven by the engine on chassis 3 or the second hydraulic pump 6 that is driven by the first driving motor 7.

The central control unit 1 is configured to: when receiving a travelling instruction, determine whether the engine on chassis 3 has been started; and if the engine on chassis 3 has not been started, control to start the first driving motor 7 such that the first driving motor 7 drives the second hydraulic pump 6 and thus the power-assisted steering motor 2 can be driven through the second oil path of the second hydraulic pump 6.

Specifically, a driver transmits the travelling instruction to the central control unit 1. After receiving the travelling instruction transmitted from the driver, the central control unit 1 determines whether the engine on chassis 3 has been started. If the engine on chassis 3 has not been started, the central control unit 1 controls to start the first driving motor 7 such that the first driving motor 7 drives the second hydraulic pump 6. Then, the oil path of the second hydraulic pump 6 is open, thus oil can be transmitted to the power-assisted steering motor 2 via the directional control valve 5 so as to power the power-assisted steering motor 2. If the engine on chassis 3 has been started (which means this vehicle has been started), the engine on chassis 3 can drive the first hydraulic pump 4. Then, the oil path of the first hydraulic pump 4 is open, thus hydraulic oil can be transmitted to the power-assisted steering motor 2 via the directional control valve 5.

The central control unit 1 can be a separate unit or integrated with a control system of the mobile inspection device. It is appreciated by those skilled in the art that any control scheme for implementing the present disclosure is intended to be included within the scope of the present disclosure.

The directional control valve 5 may be a bi-directional control valve which can switch between the first oil path of the first hydraulic pump 4 and the second oil path of the second hydraulic pump 6. General principles and operations of the bi-directional control valve are well known in the art and thus will not be explained here.

The present disclosure provides the directional control valve, the second hydraulic pump and the first driving motor. When determining the engine on chassis has not been started, the central control unit controls to start the first driving motor according to the received travelling instruction such that the first driving motor drives the second hydraulic pump and then the power-assisted steering motor can be driven through the second oil path of the second hydraulic pump. Accordingly, the power-assisted steering system can be driven to operate when the mobile inspection device is in operation and the engine on chassis is not started, thus it is possible to drive the power-assisted steering system without the engine on chassis. Moreover, it is easy to manipulate a steering wheel to control a travelling direction, thus it is possible to improve operational flexibility and adaptability of the power-assisted steering system of the mobile inspection device.

Further, the power-assisted steering system further comprises a second driving motor 8 which is connected to a transmission shaft on chassis (not shown) of the vehicle. The second driving motor 8 can serve as a third-party power source of the vehicle that is able to drive the vehicle to travel forward, travel backward and steer.

The central control unit 1 is further configured to: after controlling to start the first driving motor 7, control to start the second driving motor 8 so as to power the vehicle.

Specifically, the central control unit 1 is configured to: after controlling to start the first driving motor 7 for a predetermined period of time, control to start the second driving motor 8. Preferably, the predetermined period of time can be a few seconds.

The central control unit 1 of the power-assisted steering system according to the disclosure controls to, when determining the engine on chassis 3 has not been started, start the first driving motor 7 first so as to activate the power-assisted steering motor 2, which ensures the power-assisted steering system is operable. Then, after a few seconds, the central control unit 1 controls to start the second driving motor 8 so as to power the vehicle. Therefore, it is ensured that the power-assisted steering system is operable when the vehicle is started or travelling, thus the driver can operate a steering wheel 11 with the assistance of the power-assisted steering system.

The power-assisted steering system according to the first example is mainly applied in a case where the driver manipulates the mobile inspection device (i.e., the driver drives the vehicle). The driver can send the travelling instruction to the central control unit. If the engine on chassis has not been started, the power-assisted steering motor is powered through the first driving motor and the second hydraulic pump. Therefore, the driver can operate a steering wheel with the assistance of the power-assisted steering system.

Second Example

Figure 2:
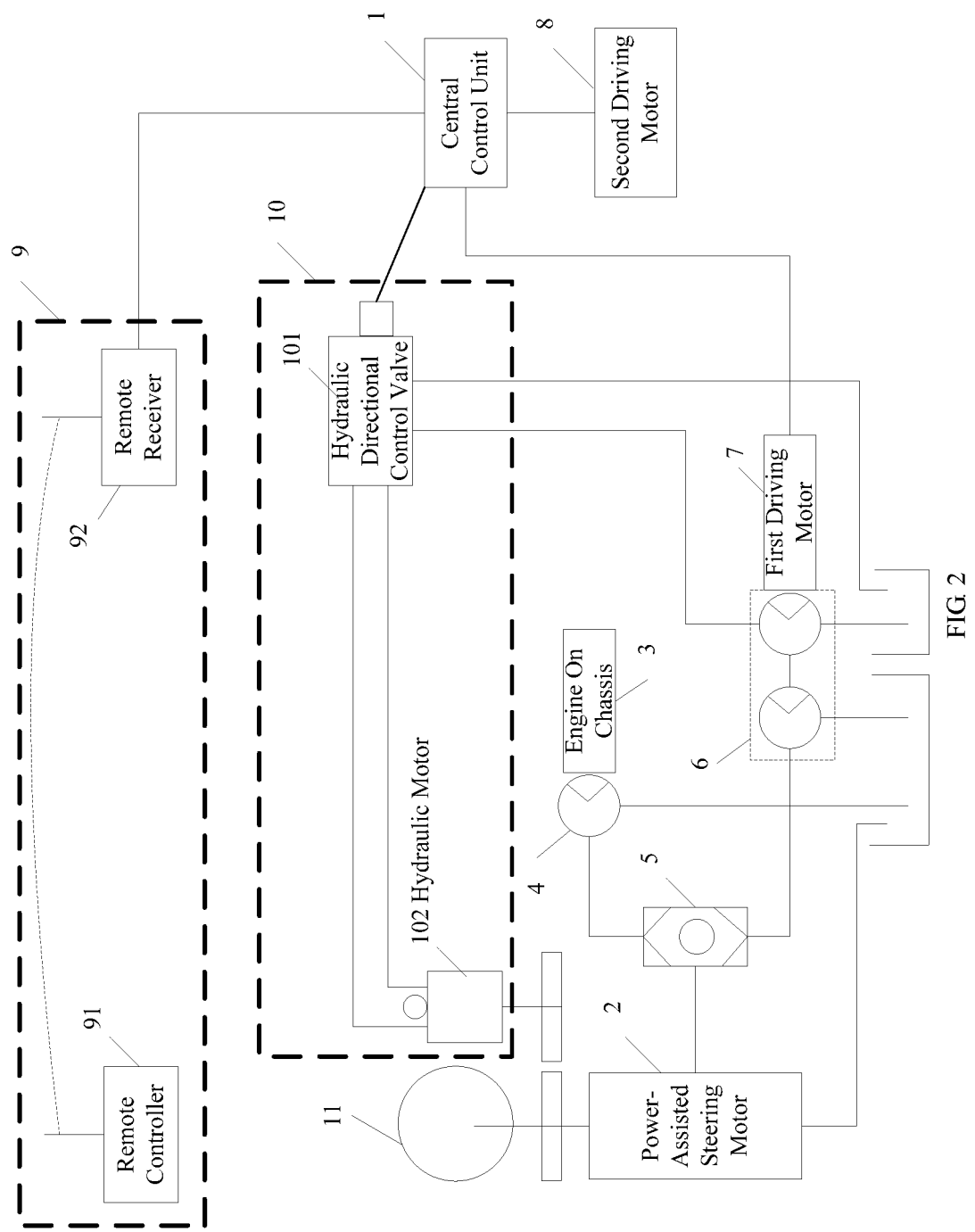
FIG. 2 is a structural diagram of a power-assisted steering system according to a second example of the present disclosure.

FIG. 2 is a structural diagram of a power-assisted steering system according to a second example of the present disclosure. As shown in FIG. 2, the power-assisted steering system comprises a central control unit 1, a power-assisted steering motor 2, an engine on chassis 3, a first hydraulic pump 4, a directional control valve 5, a second hydraulic pump 6 and a first driving motor 7. The power-assisted steering system can further comprise a second driving motor 8.

The connections, principles, operations and functions of respective components of the second example are same with that of the first example, and thus will not be explained again. The power-assisted steering system of the second example differs from the power-assisted steering system of the first example in that: the power-assisted steering system of the second example comprises a remote control device 9 and a steering device 10. The steering wheel 11 can be manipulated with the assistance of the remote control device 9 and steering device 10, thus it is possible to achieve self-driving of the mobile inspection device.

According to the second example, the central control unit 1 is further configured to: receive a travelling instruction transmitted from the remote control device 9; and when determining the engine on chassis 3 has not been started, control steering of the steering device 10 according to the travelling instruction.

As shown in FIG. 2, the remote control device 9 comprises a remote controller 91 and a remote receiver 92. The remote controller 91 is adapted to receive a travelling instruction transmitted from a user and transmit the travelling instruction to the remote receiver 92. The remote receiver 92 is adapted to receive the travelling instruction transmitted from the remote controller 91 and transmit the travelling instruction to the central control unit 1.

The remote controller 91 and the remote receiver 92 of the remote control device 9 can communicate with each other via infrared communication modules, Bluetooth communication modules, 3G communication modules and the like. The principle and operation of communication between the remote controller 91 and the remote receiver 92 are well known in the art and thus will not be explained here. It is appreciated by those skilled in the art that any remote communication scheme for remote transmitting of control signals is intended to be included within the scope of the present disclosure.

The remote control device 9 transmits the travelling instruction transmitted from the user to the central control unit 1 such that the central control unit 1 can perform a general control.

According to the second example, the second hydraulic pump 6 may be a hydraulic duplex pump. One hydraulic pump of the hydraulic duplex pump (the left hydraulic pump as shown in FIG. 2) is connected to the directional control valve 5 via the second oil path, and the other hydraulic pump of the hydraulic duplex pump (the right hydraulic pump as shown in FIG. 2) is connected to the steering device 10 via a third oil path.

The hydraulic duplex pump has a transmission shaft, wherein one end of the transmission shaft causes respective rotors of the two hydraulic pumps to rotate, and the other end of the transmission shaft is driven through the first driving motor 7. The hydraulic duplex pump comprises a common oil inlet and separate oil outlets. The left hydraulic pump is dedicated to driving, while the right hydraulic pump is dedicated to steering. A coupling is provided to achieve simultaneous operations of the two hydraulic pumps. When the first driving motor 7 is started, the hydraulic duplex pump can drive the power-assisted steering motor 2 via the second oil path and supply oil to the steering device 10 via the third oil path.

As shown in FIG. 2, the steering device 10 comprises a hydraulic directional control valve 101 and a hydraulic motor 102. The hydraulic motor 102 is connected to each of the hydraulic directional control valve 101 and the steering wheel 11.

The central control unit 1 is further configured to: control the hydraulic directional control valve 101 according to the received travelling instruction so as to select an oil path through which the oil will be supplied to the hydraulic motor 102, such that the hydraulic motor 102 controls the steering of the steering wheel 11 according to the selected oil path.

Specifically, the remote receiver 92 transmits the travelling instruction to the central control unit 1, which then can control the steering of the steering device 10 according to the remote instruction (i.e., the travelling instruction) such that it is possible to achieve an automatic operation of the mobile inspection device.

Specifically, the third oil path of the right hydraulic pump of the second hydraulic pump 6 is connected to an oil inlet of the hydraulic directional control valve 101. The hydraulic directional control valve 101 may be a solenoid valve that is provided with three switches corresponding to three output oil paths of the third oil path respectively, wherein the output oil paths correspond to three steering modes (i.e., turning right, travelling straight forward and turning left) of the hydraulic motor 102. The hydraulic directional control valve 101 can control to open a corresponding switch of the solenoid valve according to a steering control signal in the travelling instruction so as to select a corresponding output oil path of the third oil path and control the hydraulic motor 102, which then causes the steering wheel 11 to steer. For example, the steering control signal in the travelling instruction may be a level signal, wherein a high level signal (1V)

represents turning right, a low level signal (−1V) represents turning left, and a zero level signal (0V) represent travelling straight forward.

As compared with the first example, the power-assisted steering system according to the second example provides remote control of the power-assisted steering system and remote control of the steering. The power-assisted steering system according to the second example is mainly applied in a case where the mobile inspection device is manipulated without a driver (i.e., the vehicle is driven without a driver). The remote control device can send the travelling instruction to the central control unit. If the engine on chassis has not been started, the power-assisted steering motor is powered through the first driving motor and the second hydraulic pump such that it is ensured that the power-assisted steering system can normally operate. Moreover, the hydraulic directional control valve is controlled to select the output oil path according to the travelling instruction (steering control signal) so as to control the steering of the hydraulic motor. The control process is performed without a driver.

Third Example

According to a third example, there is provided a mobile inspection device, which comprises a vehicle and a radiation source and a detection device that are disposed on the vehicle, wherein the vehicle comprises the afore-mentioned power-assisted steering system.

The vehicle, the positions of the radiation source and the detection device on the vehicle, and the connection thereof are well known in the art and thus will not be explained here.

The above embodiments describe technical principles of the present disclosure. The above embodiments are merely provided for describing the principle of the present inventions, but not intended to limit the scope of the present inventions in any way. Other specific implementations may be made by one skilled in the art based on the explanation herein without creative work, and all these implementations will fall into the protection scope of the inventions herein.

What is claimed is:
1. A power-assisted steering system, comprising:
a central control unit,
a power-assisted steering motor, and
a first hydraulic pump connected to an engine on chassis, wherein the power-assisted steering system further comprises a directional control valve, a second hydraulic pump and a first driving motor,
wherein the first driving motor is connected to the second hydraulic pump;
wherein the directional control valve is connected to each of the first hydraulic pump, the second hydraulic pump and the power-assisted steering motor so as to switch between a first oil path of the first hydraulic pump and a second oil path of the second hydraulic pump for driving the power-assisted steering motor;
wherein the central control unit is configured to:
when receiving a travelling instruction, determine whether the engine on chassis has been started; and
if the engine on chassis has not been started, control to start the first driving motor such that the first driving motor drives the second hydraulic pump and thus the power-assisted steering motor can be driven through the second oil path of the second hydraulic pump.
2. The power-assisted steering system according to claim 1, further comprising a remote control device and a steering device connected to a steering wheel;
the central control unit is further configured to: receive the travelling instruction transmitted from the remote control device; and when determining the engine on chassis has not been started, control steering of the steering device according to the travelling instruction.
3. The power-assisted steering system according to claim 2, wherein the second hydraulic pump is a hydraulic duplex pump, wherein one hydraulic pump of the hydraulic duplex pump is connected to the directional control valve via the second oil path, and the other hydraulic pump of the hydraulic duplex pump is connected to the steering device via a third oil path;
when the first driving motor is started, the hydraulic duplex pump can drive the power-assisted steering motor via the second oil path and supply oil to the steering device via the third oil path.
4. The power-assisted steering system according to claim 3, wherein the steering device comprises a hydraulic directional control valve and a hydraulic motor, wherein the hydraulic motor is connected to each of the hydraulic directional control valve and the steering wheel;
the central control unit is further configured to: control the hydraulic directional control valve according to the travelling instruction so as to select an oil path through which oil will be supplied to the hydraulic motor, such that the hydraulic motor controls steering of the steering wheel according to the selected oil path.
5. The power-assisted steering system according to claim 3, wherein the remote control device comprises a remote controller and a remote receiver, wherein the remote receiver is adapted to receive the travelling instruction transmitted from the remote controller and transmit the travelling instruction to the central control unit.
6. The power-assisted steering system according to claim 5, wherein the steering device comprises a hydraulic directional control valve and a hydraulic motor, wherein the hydraulic motor is connected to each of the hydraulic directional control valve and the steering wheel;
the central control unit is further configured to: control the hydraulic directional control valve according to the travelling instruction so as to select an oil path through which oil will be supplied to the hydraulic motor, such that the hydraulic motor controls steering of the steering wheel according to the selected oil path.
7. The power-assisted steering system according to claim 6, further comprising a second driving motor;
the central control unit is further configured to: after controlling to start the first driving motor, control to start the second driving motor so as to power a vehicle.
8. The power-assisted steering system according to claim 7, wherein the central control unit is configured to: after controlling to start the first driving motor for a predetermined period of time, control to start the second driving motor.
9. The power-assisted steering system according to claim 2, wherein the remote control device comprises a remote controller and a remote receiver, wherein the remote receiver is adapted to receive the travelling instruction transmitted from the remote controller and transmit the travelling instruction to the central control unit.
10. The power-assisted steering system according to claim 2, wherein the steering device comprises a hydraulic directional control valve and a hydraulic motor, wherein the hydraulic motor is connected to each of the hydraulic directional control valve and the steering wheel;
the central control unit is further configured to: control the hydraulic directional control valve according to the travelling instruction so as to select an oil path through which oil will be supplied to the hydraulic motor, such that the hydraulic motor controls steering of the steering wheel according to the selected oil path.

11. The power-assisted steering system according to claim 2, further comprising a second driving motor;
the central control unit is further configured to: after controlling to start the first driving motor, control to start the second driving motor so as to power a vehicle.

12. The power-assisted steering system according to claim 1, further comprising a second driving motor;
the central control unit is further configured to: after controlling to start the first driving motor, control to start the second driving motor so as to power a vehicle.

13. The power-assisted steering system according to claim 12, wherein the central control unit is configured to: after controlling to start the first driving motor for a predetermined period of time, control to start the second driving motor.

14. A mobile inspection device, comprising: a vehicle, a radiation source and a detection device that are disposed on the vehicle, wherein the vehicle comprises a power-assisted steering system, wherein
the power-assisted steering system comprises: a central control unit, a power-assisted steering motor and a first hydraulic pump connected to an engine on chassis, wherein the power-assisted steering system further comprises a directional control valve, a second hydraulic pump and a first driving motor, wherein the first driving motor is connected to the second hydraulic pump; the directional control valve is connected to each of the first hydraulic pump, the second hydraulic pump and the power-assisted steering motor so as to switch between a first oil path of the first hydraulic pump and a second oil path of the second hydraulic pump for driving the power-assisted steering motor;
the central control unit is configured to: when receiving a travelling instruction, determine whether the engine on chassis has been started; and if the engine on chassis has not been started, control to start the first driving motor such that the first driving motor drives the second hydraulic pump and thus the power-assisted steering motor can be driven through the second oil path of the second hydraulic pump.

15. The mobile inspection device according to claim 14, wherein the power-assisted steering system further comprises a remote control device and a steering device connected to a steering wheel;

the central control unit is further configured to: receive the travelling instruction transmitted from the remote control device; and when determining the engine on chassis has not been started, control steering of the steering device according to the travelling instruction.

16. The mobile inspection device according to claim 15, wherein the second hydraulic pump is a hydraulic duplex pump, wherein one hydraulic pump of the hydraulic duplex pump is connected to the directional control valve via the second oil path, and the other hydraulic pump of the hydraulic duplex pump is connected to the steering device via a third oil path;
when the first driving motor is started, the hydraulic duplex pump can drive the power-assisted steering motor via the second oil path and supply oil to the steering device via the third oil path.

17. The mobile inspection device according to claim 15, wherein the remote control device comprises a remote controller and a remote receiver, wherein the remote receiver is adapted to receive the travelling instruction transmitted from the remote controller and transmit the travelling instruction to the central control unit.

18. The mobile inspection device according to claim 15, wherein the steering device comprises a hydraulic directional control valve and a hydraulic motor, wherein the hydraulic motor is connected to each of the hydraulic directional control valve and the steering wheel;
the central control unit is further configured to: control the hydraulic directional control valve according to the travelling instruction so as to select an oil path through which oil will be supplied to the hydraulic motor, such that the hydraulic motor controls steering of the steering wheel according to the selected oil path.

19. The mobile inspection device according to claim 14, wherein the power-assisted steering motor further comprises a second driving motor;
the central control unit is further configured to: after controlling to start the first driving motor, control to start the second driving motor so as to power the vehicle.

20. The mobile inspection device according to claim 19, wherein the central control unit is configured to: after controlling to start the first driving motor for a predetermined period of time, control to start the second driving motor.

* * * * *